US012531341B2

(12) United States Patent
Boyle

(10) Patent No.: US 12,531,341 B2
(45) Date of Patent: Jan. 20, 2026

(54) FILTER-COUPLED ANTENNA SYSTEM

(71) Applicant: QUALCOMM INCORPORATED, San Diego, CA (US)

(72) Inventor: Kevin Robert Boyle, Horsham (GB)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 18/522,487

(22) Filed: Nov. 29, 2023

(65) Prior Publication Data

US 2025/0174897 A1 May 29, 2025

(51) Int. Cl.
*H01Q 1/24* (2006.01)
*H01Q 5/378* (2015.01)
*H01Q 23/00* (2006.01)

(52) U.S. Cl.
CPC ............. *H01Q 5/378* (2015.01); *H01Q 1/243* (2013.01); *H01Q 23/00* (2013.01)

(58) Field of Classification Search
CPC .......... H01Q 1/243; H01Q 9/30; H01Q 23/00; H01Q 5/30; H01Q 5/50; H01Q 5/307; H01Q 5/314; H01Q 5/321; H01Q 5/378
See application file for complete search history.

(56) References Cited

U.S. PATENT DOCUMENTS 7,848,771 B2 12/2010 Boyle
8,200,302 B2 6/2012 Yamamoto et al.
8,355,761 B2 * 1/2013 Harada .................... H01Q 9/36 455/90.3
9,331,397 B2 * 5/2016 Jin ......................... H01Q 1/243
9,496,608 B2 11/2016 Jiang et al.
9,543,660 B2 * 1/2017 Rajagopalan .......... H01Q 9/045
10,476,167 B2 11/2019 Ayala Vazquez et al.
2011/0241950 A1 10/2011 Milosavljevic et al.
2012/0229347 A1 * 9/2012 Jin ......................... H01Q 21/28 343/702
2013/0038494 A1 * 2/2013 Kuonanoja .............. H01Q 9/42 343/745
2013/0214979 A1 8/2013 McMilin et al.
2014/0274231 A1 9/2014 De Luis et al.
2015/0249292 A1 * 9/2015 Ouyang ................. H01Q 3/247 343/702
2017/0264001 A1 * 9/2017 Azad ...................... H01Q 13/10

(Continued)

OTHER PUBLICATIONS

International Search Report and Written Opinion—PCT/US2024/053000—ISA/EPO—Jan. 31, 2025.

*Primary Examiner* — Tung X Le
(74) *Attorney, Agent, or Firm* — SUNSTEIN LLP/Qualcomm Incorporated

(57) ABSTRACT

A signal transfer method includes: transducing a first signal using a first antenna element, of an apparatus, configured to resonate in a higher frequency range; transducing a second signal using a second antenna element, of the apparatus, configured to resonate in a lower frequency range, the lower frequency range spanning one or more frequencies that are below frequencies in the higher frequency range; providing an approximate open circuit over the lower frequency range to a transmission line connected to the second antenna element; and providing an approximate short circuit over the higher frequency range to the transmission line to inhibit a parasitic effect of the second antenna element on the first antenna element.

23 Claims, 6 Drawing Sheets

(56) References Cited

U.S. PATENT DOCUMENTS

| | | | | |
|---|---|---|---|---|
| 2018/0034148 | A1 | 2/2018 | Nam et al. | |
| 2019/0097314 | A1* | 3/2019 | Rajagopalan .......... | H01Q 13/10 |
| 2019/0115653 | A1 | 4/2019 | Yun et al. | |

* cited by examiner

FILTER-COUPLED ANTENNA SYSTEM

BACKGROUND

Wireless communication devices are increasingly popular and increasingly complex. For example, mobile telecommunication devices have progressed from simple phones, to smart phones with multiple communication capabilities (e.g., multiple cellular communication protocols, Wi-Fi, BLUETOOTH® and other short-range communication protocols), supercomputing processors, cameras, etc. Wireless communication devices have antennas to support various functionality such as communication over a range of frequencies, reception of Global Navigation Satellite System (GNSS) signals, also called Satellite Positioning Signals (SPS signals), etc.

With several antennas disposed in a single wireless communication device, coupling between antennas may degrade performance. For example, power in a transmitted communication signal may be received and dissipated by another antenna in the device, e.g., an antenna for receiving GNSS signals, an antenna for receiving and transmitting other communication signals, etc. As another example, power may flow between antenna systems in close proximity to each other, e.g., if both of the antenna systems use a shared conductor for their respective radiators.

SUMMARY

An example apparatus includes: a first antenna element configured to resonate in a higher frequency range; a second antenna element configured to resonate in a lower frequency range, the lower frequency range spanning one or more frequencies that are below frequencies in the higher frequency range; and a filter connected to the second antenna element, the filter being configured to have a frequency-dependent impedance that is approximately an open circuit over the second frequency range and that is approximately a short circuit over the first frequency range, the filter being connected to a position of the second antenna element to inhibit a parasitic effect of the second antenna on the first antenna.

DETAILED DESCRIPTION

Figure 1:
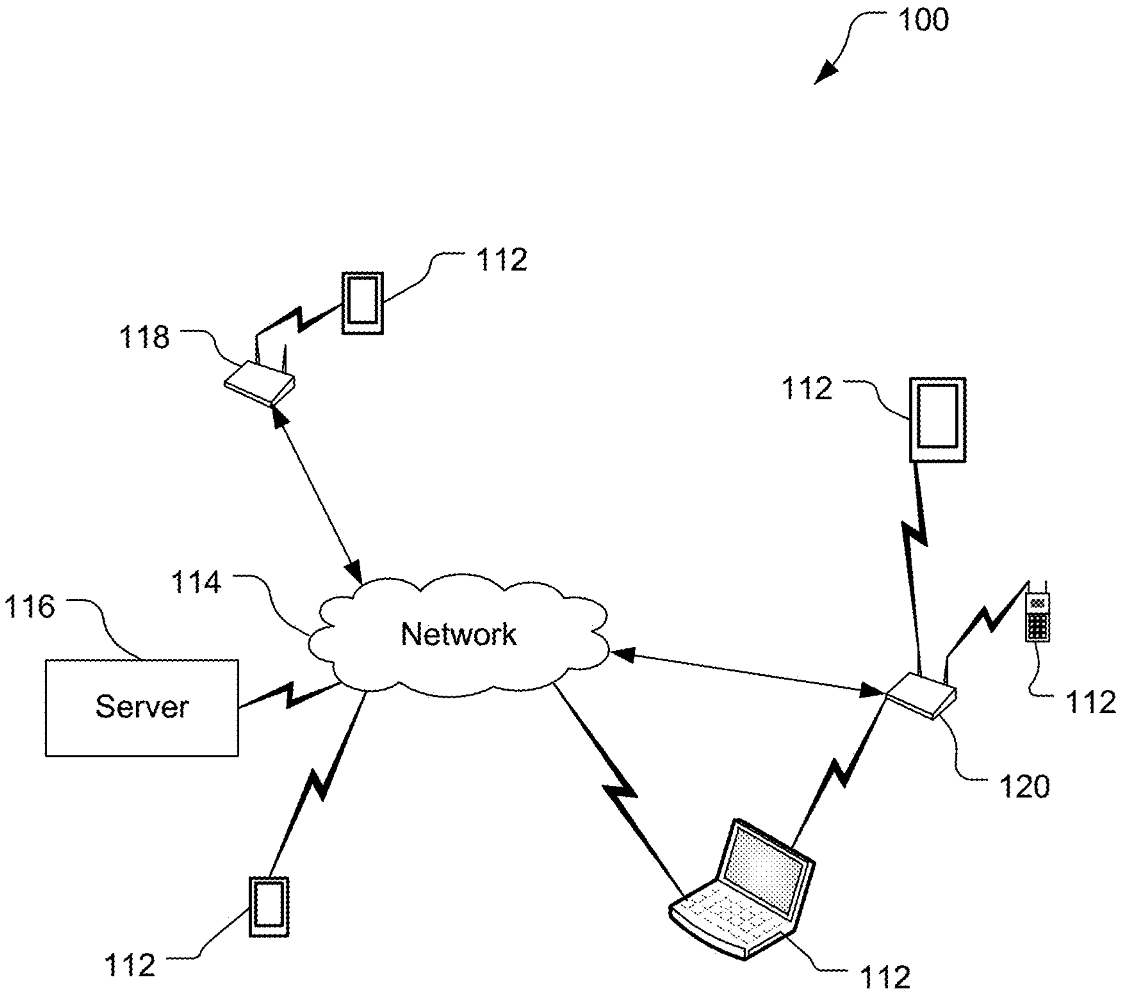
FIG. 1 is a diagram of a communication system.

Techniques are discussed herein for signal transfer with antennas using a filter with a frequency-dependent impedance. For example, an apparatus may contain two antenna systems each with a respective antenna element each configured for operation over different frequency ranges (e.g., separate ranges of frequencies), a lower frequency range and a higher frequency range. The antenna elements may be configured to resonate at different frequencies. The antenna elements may be configured and disposed such that the antenna element configured for operation over the lower frequency range may act, absent preventative measure, as a parasitic antenna element to the antenna element configured for operation over the higher frequency range. A filter with a frequency-dependent impedance may be connected to the lower-frequency-range antenna element to provide an open circuit at the lower frequency range and a short circuit at the higher frequency range to inhibit parasitic effect of the lower-frequency-range antenna element on the higher-frequency-range antenna element (e.g., inhibit parasitic coupling between the antenna elements, at least in the higher frequency range). Other configurations, however, may be used.

Items and/or techniques described herein may provide one or more of the following capabilities, as well as other capabilities not mentioned. Antenna efficiency may be improved, e.g., for antenna elements disposed in close proximity by reducing parasitic coupling between the antenna elements. Antenna efficiency for antenna systems while accommodating and/or adapting to different frequency ranges of operation. Dependence of performance of an antenna system on form of energy coupling of a parasitic antenna system may be reduced. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

As used herein, the term "user equipment" and "UE" are not specific to or otherwise limited to any particular Radio Access Technology (RAT), unless otherwise noted. In general, Ues may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on. Further, two or more UEs may communicate directly in some configurations with or without passing information to each other through a network.

Referring to FIG. 1, a communication system 100 includes mobile devices 112, a network 114, a server 116, and access points (APs) 118, 120. The communication system 100 is a wireless communication system in that components of the communication system 100 can communicate with one another (at least sometimes) using wireless connections directly or indirectly, e.g., via the network 114 and/or one or more of the access points 118, 120 (and/or one or more other devices not shown, such as one or more base transceiver stations). For indirect communications, the communications may be altered during transmission from one entity to another, e.g., to alter header information of data packets, to change format, etc. The mobile devices 112 shown are mobile wireless communication devices (although they may communicate wirelessly and via wired connections) including mobile phones (including smartphones), a laptop computer, and a tablet computer. Still other mobile devices may be used, whether currently existing or developed in the future. Further, other wireless devices (whether mobile or not) may be implemented within the communication system 100 and may communicate with each other and/or with the mobile devices 112, network 114, server 116, and/or APs 118, 120. For example, such other devices may include internet of thing (IoT) devices, medical devices, home entertainment and/or automation devices, automotive devices, etc. The mobile devices 112 or other devices may be configured to communicate in different networks and/or for different purposes (e.g., 5G, Wi-Fi communication, multiple frequencies of Wi-Fi communication, satellite communication and/or positioning, one or more types of cellular communications (e.g., GSM (Global System for Mobiles), CDMA (Code Division Multiple Access), LTE (Long-Term Evolution), etc.), Bluetooth® communication, etc.).

Figure 2:
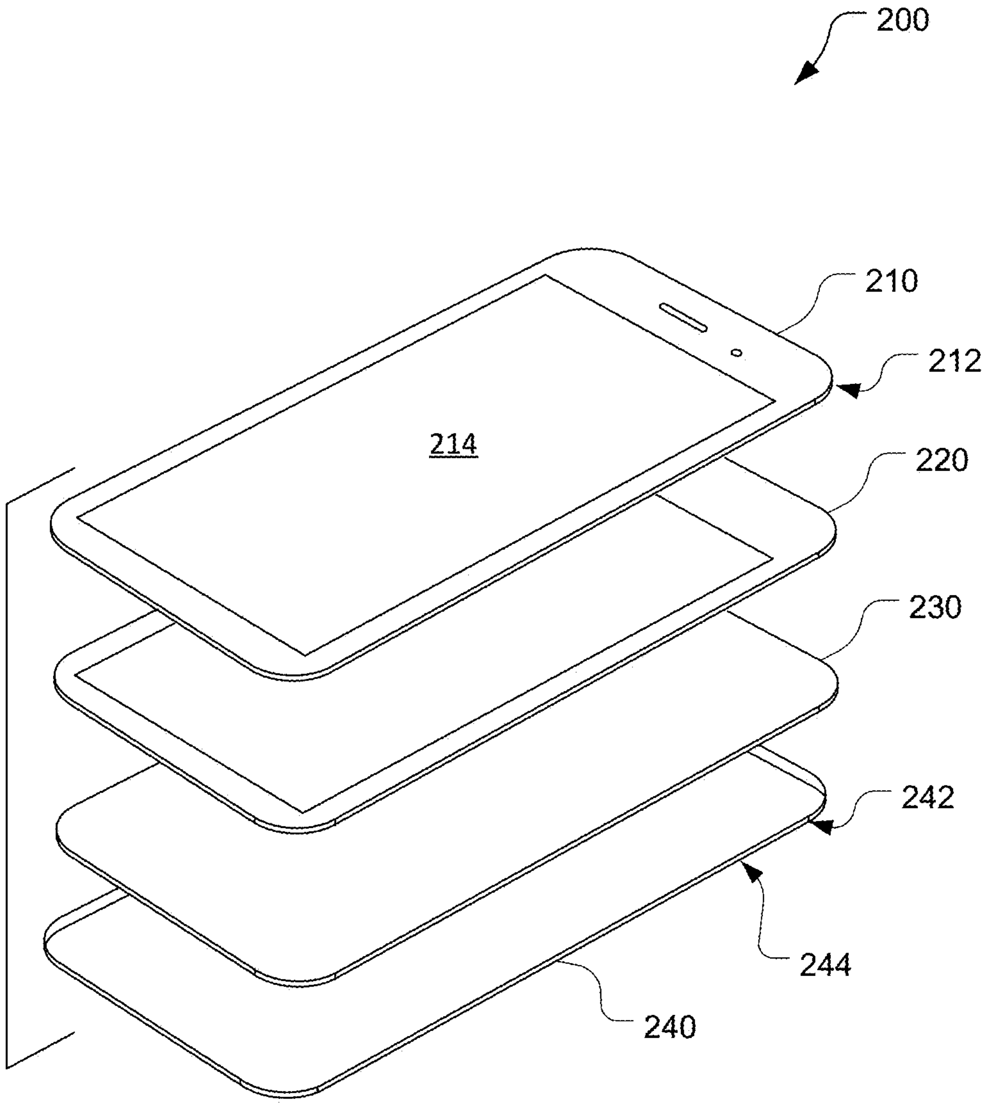
FIG. 2 is an exploded perspective view of simplified components of a mobile device shown in FIG. 1.

Referring to FIG. 2, a mobile device 200, which is an example of one of the mobile devices 112 shown in FIG. 1, includes a top cover 210, a display layer 220, a printed circuit board (PCB) layer 230, and a bottom cover 240. The mobile device 200 as shown may be a smartphone or a tablet computer but embodiments described herein are not limited to such devices. The top cover 210 includes a screen 214. The bottom cover 240 has a bottom surface 244. Sides 212, 242 of the top cover 210 and the bottom cover 240 provide an edge surface. The top cover 210 and the bottom cover 240 comprise a housing that retains the display layer 220, the PCB layer 230, and other components of the mobile device 200 that may or may not be on the PCB layer 230. For example, the housing may retain (e.g., hold, contain) or be integrated with antenna systems, front-end circuits, an intermediate-frequency circuit, and/or a processor, certain of which are discussed below. The housing may be substantially rectangular, having two sets of parallel edges in the illustrated embodiment, and may be configured to bend or fold. In this example, the housing has rounded corners, although the housing may be substantially rectangular with other shapes of corners, e.g., straight-angled (e.g.,) 45° corners, 90°, other non-straight corners, etc. Further, the size and/or shape of the PCB layer 230 may not be commensurate with the size and/or shape of either of the top or bottom covers or otherwise with a perimeter of the device. For example, the PCB layer 230 may have a cutout to accept a battery. Further, the PCB layer 230 may include sandwiched boards and/or a PCB daughter board. Daughter boards may be chosen to facilitate a design and/or manufacturing process, e.g., to reinforce a functional separation or to better utilize a space in the housing. Embodiments of the PCB layer 230 other than those illustrated may be implemented.

The device 200 may be foldable and/or bendable. For example, the top cover 210, the display layer 220, the PCB layer 230, and the bottom cover 240 may be configured to pivot (e.g., fold or bend), e.g., about an axis. The PCB layer 230 and/or the bottom cover 240 may be split into multiple parts which are operably (for the PCB layer) or physically (for the bottom cover) coupled together and configured to pivot with respect to each other.

The limited space available in a UE (e.g., a smartphone, tablet computer, etc.) presents antenna design challenges. For example, with 10 or more antennas (e.g., for LTE and sub-6 GHZ band) in a mobile phone, there may be little or no additional space available for another antenna. Because antenna frequency bandwidth varies with antenna size, with small antennas typically having narrow bandwidths, designing a single antenna to cover a wide frequency bandwidth is challenging. Further, mechanical stability of a UE (e.g., a mobile phone) may be challenging, e.g., because non-conductive (e.g., plastic) gaps in a metal frame of the UE may be needed to separate antennas, but may weaken stability of the frame and may result in thermal issues due to an inability to dissipate heat.

Figure 3:
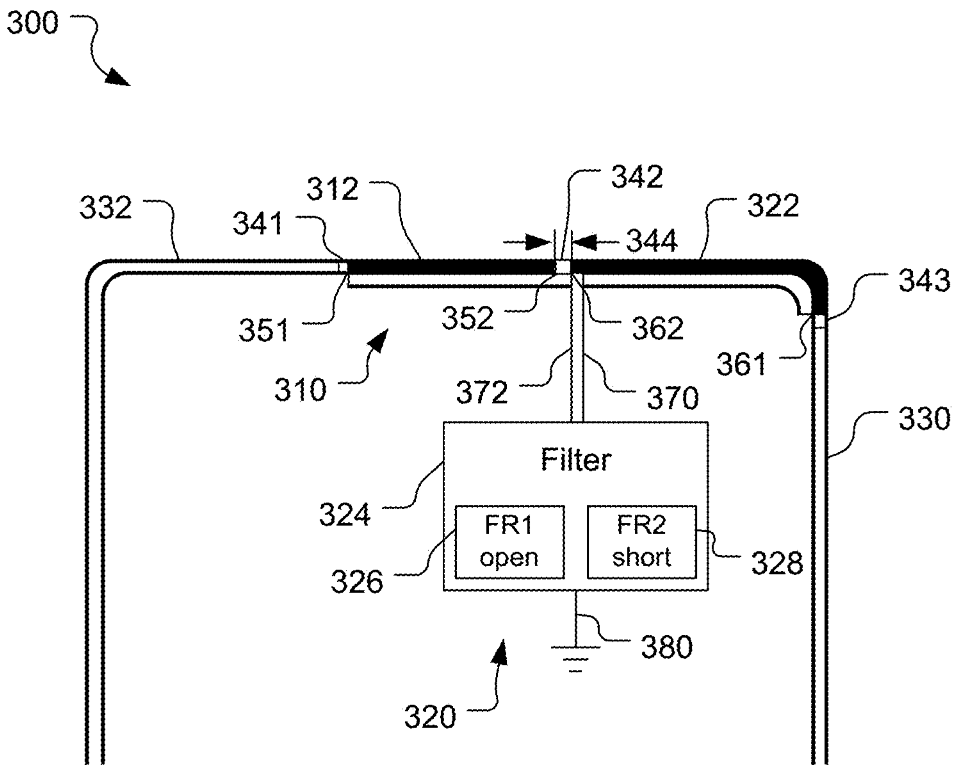
FIG. 3 is a simplified plan view of an apparatus including antenna systems.

Referring also to FIG. 3, an apparatus 300 includes antenna systems 310, 320, including antenna elements 312, 322, respectively. The apparatus 300 may be an example of the mobile device 200, or any of a variety of other apparatus. The antenna systems 310, 320 may be configured to operate at various frequencies. In this example, the antenna system 310 is configured to operate over a higher frequency range and the antenna system 320 is configured to operate over a lower frequency range, with the lower frequency range spanning one or more frequencies below frequencies in the higher frequency range. The lower and higher frequency ranges may or may not overlap. For example, the antenna system 310 may be configured for operation in a Mid-High Band (MHB) (e.g., 1.5 GHZ-2.7 GHZ) and the antenna system 320 may be configured for operation in the L1 GPS (Global Positioning System) band at 1.575 GHz. For example, the antenna elements 312, 322 of the antenna systems 310, 320, respectively, may be configured to resonate over the higher frequency band and the lower frequency band, respectively (and thus transduce signals between wireless signals and guided signals in these bands with at least a threshold efficiency, the level of which depends on application-specific requirements (e.g., network operator requirements)). The lower and higher frequency ranges may have different breadths, e.g., different fractional bandwidths. For example, the higher frequency range may have a wide fractional bandwidth, e.g., up to about 20%, and the lower frequency range may have a narrow fractional bandwidth, e.g., less than 10%, such as less than 3%. The higher frequency range may have a fractional bandwidth at least twice the fractional bandwidth of the lower frequency range (e.g., at least four times the fractional bandwidth of the lower frequency range, or at least five times the fractional bandwidth of the lower frequency range).

The antenna elements 312, 322 may have any of various configurations. In this example, the antenna elements 312, 322 are both elongated metal conductors configured to provide respective portions of a frame 330 of the apparatus 300. The antenna system 310 and the antenna system 320 may both use a portion of the frame 330, e.g., a metal frame, between gaps 341, 342, 343 (e.g., an insulator such as plastic), with the antenna elements 312, 322 thus being metal frame conductors. In this way, space may be conserved for providing the antenna systems 310, 320. Other configurations may be used. For example, while in this example the antenna elements 312, 322 are disposed at a periphery 332 of the apparatus, one or both of the antenna elements 312, 322 may be disposed proximate to, but displaced from a periphery of the apparatus, e.g., within 10 mm or within 5 mm (e.g., within about 1/10 or within about 1/20 of a wavelength of a highest frequency of the higher frequency band). As another example, one or both of the antenna elements 312, 322 may be a radiating slot. The antenna elements 312, 322 may have different configurations from each other. The antenna elements may be referred to as radiating elements even though antenna elements are reciprocal, being capable of radiating wireless signals and receiving wireless signals.

The antenna elements 312, 322 are configured and disposed such that the antenna element 322 would act as a parasitic antenna element to the antenna element 312 absent preventative measure (e.g., one or more preventative devices and/or one or more preventative actions) while both of the antenna elements 312, 322 are concurrently active (such that switched detuning is not an option). For example, the antenna element 312 may have a first end 351 and a second end 352, and the antenna element 322 may have a first end 361 and a second end 362, with the second ends 352, 362 separated by the gap 342, with the gap 342 having a width 344 of less than one-tenth (1/10) of a wavelength of a highest frequency in the higher frequency range (of the antenna element 312), e.g., less than 10 mm such as between 1 mm and 3 mm. As another example, the antenna elements 312, 322 may be closely coupled such that, without preventative measure, the insertion loss (also called S21) would be less than-8 dB and/or such that energy coupled between the antenna elements 312, 322 while conjugately matched would be less than-8 dB. The parasitic effect of the antenna element 312 on the antenna element 322 may reduce efficiency of the antenna system 320 an unacceptable amount (e.g., more than 2 dB, such as more than 4 dB, over at least a portion of the higher frequency range).

Figure 4:
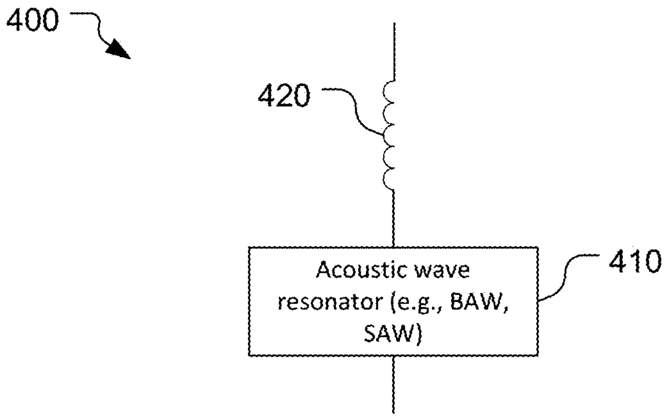
FIG. 4 is a simplified plan view of an example of the apparatus shown in FIG. 3.

The antenna system 310 includes a filter 324. The filter 324 is configured to have a frequency-dependent impedance to provide an open circuit 326 over the lower frequency range (called FR1) and to provide a short circuit 328 over the higher frequency range (called FR2). The filter 324 is connected to the antenna element 322 away from a feed (energy coupler), and is connected to ground 380 (e.g., a PCB ground). The filter 324 is connected to the antenna element 312 at a location to help reduce the parasitic effect on the antenna element 312 (e.g., negative impact on efficiency of the antenna element 312) due to the short circuit 328 at the higher frequency range. For example, the filter 324 may be connected to the antenna element 322 proximate to the antenna element 312, e.g., proximate to the end 362. In the example shown in FIG. 3, the filter 324 is connected to the antenna element 322 by a transmission line 370 at the end 362 of the antenna element 322. This is an example, and other configurations may be used. For example, the filter 324 may connected to the antenna element 322 by the transmission line 370 proximate to, but displaced from, the end 362 of the antenna element 322. For example, a closest point of connection (e.g., of a left edge 372 in this example) of the transmission line 370 to the end 362 of the antenna element 322 may be less than one-fifth, e.g., less than one-tenth, of a wavelength of a highest frequency of the higher frequency range (e.g., less than about 11 mm with the higher frequency range spanning 1.5 GHZ-2.7 GHZ). The parasitic effect of the antenna system 320 on the antenna system 310 may depend on a source impedance of the antenna system 320 in the higher frequency band (FR2). Providing a short circuit at the higher frequency band at a feed of the antenna element 322 (e.g., as shown in FIG. 4) would result in a parasitic antenna element at a higher frequency than if the feed appeared as an open circuit at FR2, but may still negatively affect the efficiency of the antenna element 322 more than is acceptable. By providing the filter 324 proximate to the end 362 and providing a short circuit at FR2, the antenna element 322 appears reflective to the antenna element 312 such that the presence of the antenna element 322 may not significantly decrease (e.g., decrease less than 1 dB, e.g., less than 0.5 dB) the efficiency of the antenna element 312.

While called an open circuit and a short circuit, the open circuit 326 and the short circuit 328 may provide an approximate open circuit and an approximate short circuit, respectively. For example, the open circuit 326 may have a normalized impedance magnitude of at least 10 (ten) over the higher frequency range FR2. As another example, the short circuit 328 may have a normalized impedance magnitude of less than 0.1 (e.g., less than 0.05) over the lower frequency range FR1. Thus, for example, if the transmission line 370 has an impedance of about 50 ohms (22), then the open circuit 326 may have an impedance magnitude of at least 500 ohms and the short circuit 328 may have an impedance magnitude of less than 5 ohms (e.g., less than 2.5 ohms). The open circuit 326 and the short circuit 328 provide highly reflective impedances.

Referring also to FIG. 4, a filter 400, which is an example of the filter 324, includes an acoustic wave resonator 410 and an inductor 420 in series with the acoustic wave resonator 410. The inductor 420 is optional, and may be omitted from the filter 400. The acoustic wave resonator 410 may be a bulk acoustic wave (BAW) resonator or a surface acoustic wave (SAW) resonator. Conventional SAW/BAW filters (i.e., filters using SAW or BAW resonators) typically use a ladder arrangement (typically four resonators arranged in shut, series, shunt, series). The filter 400, however, consists of a single acoustic wave filter. While other configurations of filters (e.g., L-C circuits) may be used, use of the acoustic wave resonator 410 may provide better performance. For example, the acoustic wave resonator 410 may have a quality factor on the order of 1,000, which provides a better quality factor than other types (e.g., L-C) circuits that typically have a quality factor of about 50. The inductor 420 may be configured to provide a desired inductance for the filter 400 to provide the short circuit 328 at a desired frequency range. The inductor 420 may be configured to provide a small inductance, e.g., 2 nH, with very low loss.

Figure 5:
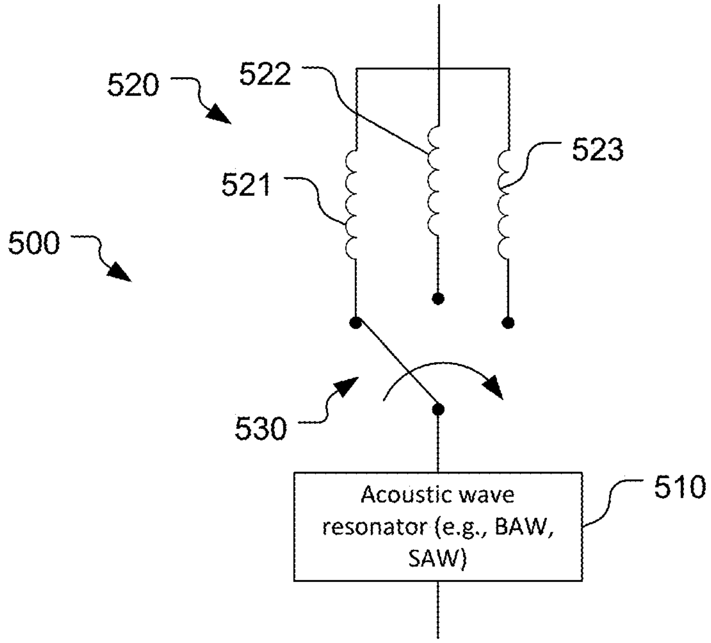
FIG. 5 is a simplified circuit diagram of an example of a filter shown in FIG. 3.

Referring also to FIG. 5, a filter 500, which is an example of the filter 324, includes an acoustic wave resonator 510, an inductor bank 520, and a switch 530. The inductor bank 520 includes multiple inductors, here inductors 521, 522, 523. The inductors 521-523 may be configured to provide different inductances and the switch 530 configured to selectively connect one of the inductors 521-523 to the resonator 510 such that the filter 500 may provide the short circuit 328 at a desired frequency range. The switch 530 may be controlled (e.g., by a processor discussed with respect to FIG. 6) to selectively connect one of the inductors 521-523 in series with the acoustic wave resonator 510.

Figure 6:
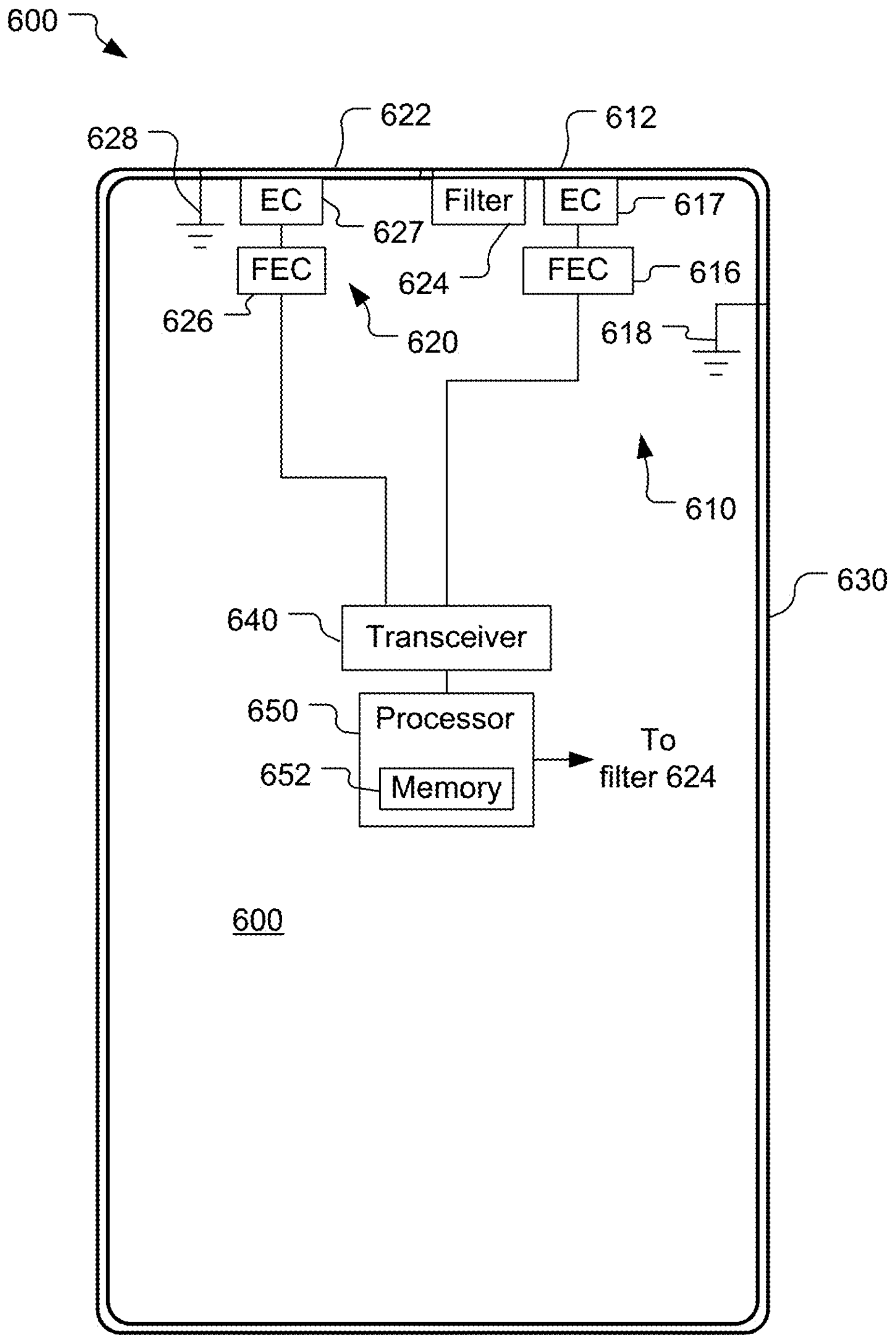
FIG. 6 is a simplified plan view of another apparatus including antenna systems.

Referring also to FIG. 6, an apparatus 600 includes antenna systems 610, 620, a frame 630, a transceiver 640, and a processor 650. The apparatus 600 may be an example of the apparatus 300. This is an example, and other types of apparatus may be used and/or other quantities of antennas may be provided in the apparatus 600. For example, some present smartphones include eight (8) or more antennas, e.g., 11 or more antennas. The antenna systems 610, 620 include antenna elements 612, 622, front-end circuits (FECs) 616, 626, energy couplers (ECs) 617, 627, and ground connectors 618, 628, respectively. The antenna system 610 also includes a filter 624, which is an example of the filter 324 (e.g., the filter 400 or the filter 500). The antenna system 610 is configured for operation over a lower frequency range and the antenna system 620 is configured for operation over a higher frequency range. In the example shown, the FEC 616, the EC 617, and the filter 624 of the antenna system 610 are disposed along or near an upper edge of the apparatus 600, and the ground connector 618 is disposed along or near a right edge of the apparatus 600. Also in the example shown, the FEC 626, the EC 627, and the ground connector 628 of the antenna system 620 are disposed along or near a top edge of the apparatus 600. One or both of the antenna systems 610, 620 may be disposed elsewhere relative to the apparatus 600.

The front-end circuits 616, 626 may be configured to provide one or more signals to be radiated by the antenna elements 612, 622 of the antenna systems 610, 620 and/or to receive and process one or more signals that are received by, and provided to the front-end circuits 616, 626 from the antenna elements 612, 622 via the energy couplers 617, 627. The energy couplers 617, 627 are configured to convey energy to and/or from antenna elements of the antenna systems 610, 620, respectively. One or more of the front-end circuits 616, 626 may include a respective matching circuit to facilitate transfer of signals from the FEC(s) 616, 626 to the EC(s) 617, 627 and from the EC(s) 617, 627 to the FEC(s) 616, 626. The front-end circuits 616, 626 may be configured to process (e.g., amplify, route, filter, etc.) RF (Radio Frequency) signals received from the transceiver 640 or the antenna elements 612, 622, e.g., without significantly adjusting a frequency thereof. The transceiver 640 may be configured to convert a frequency of signals between baseband and RF (e.g., a frequency for wireless transmission or reception) in a direct conversion or heterodyne architecture.

The front-end circuits 616, 626 (also called radio frequency (RF) circuits) are coupled to the transceiver 640, which is coupled to the processor 650 that includes a memory 652. The memory 652 may be a non-transitory, processor-readable storage medium that includes software with processor-readable instructions that are configured to cause the processor 650 to perform functions (e.g., possibly after compiling the instructions). The processor 650 may be implemented as a modem or a portion thereof. One or more of the antenna systems 610, 620 may comprise a wire inverted-F antenna (WIFA). The processor 650, e.g., in conjunction with instructions stored in the memory 652, may control the filter 624, e.g., the filter 500, to cause the switch 530 to selectively couple one of the inductors 521-523 to the acoustic wave resonator 510, e.g., to adjust a frequency range of the short circuit 328 to a desired frequency range (or at least to cover a desired frequency).

Figure 7:
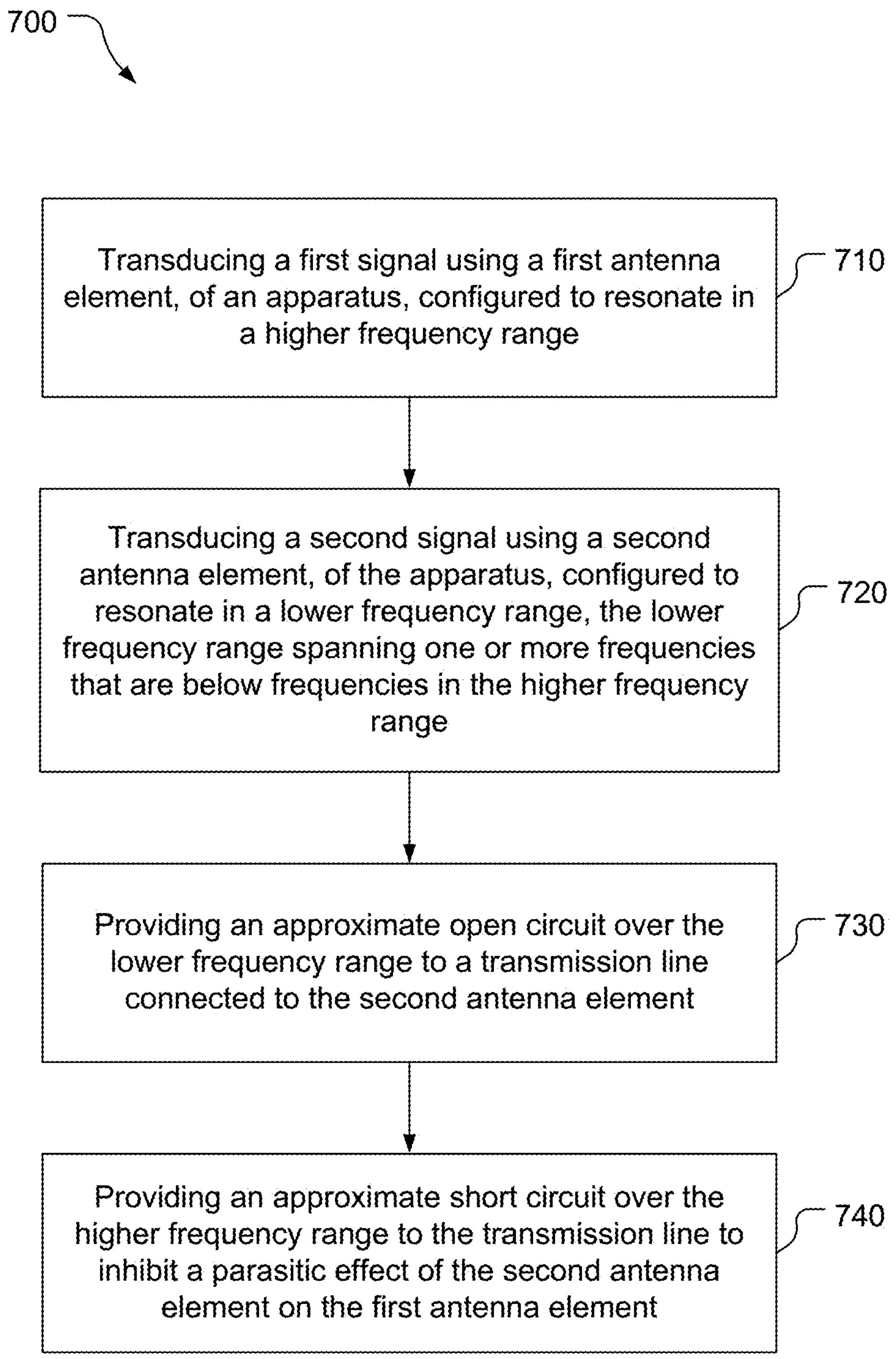
FIG. 7 is a block diagram of a signal transfer method.

Referring to FIG. 7, with further reference to FIGS. 1-6, a block flow diagram of a signal transfer method 700 includes the stages shown. The method 700 is, however, an example and not limiting. The method 700 may be altered, e.g., by having one or more stages added, removed, rearranged, combined, performed concurrently, and/or having single stages split into multiple stages.

At stage 710, the method 700 includes transducing a first signal using a first antenna element, of an apparatus, configured to resonate in a higher frequency range. For example, the antenna element 312 may be used to transduce between wireless and guided (e.g., wired) signals in a first frequency range over which the antenna element 312 is configured to resonate.

At stage 720, the method 700 includes transducing a second signal using a second antenna element, of the apparatus, configured to resonate in a lower frequency range, the lower frequency range spanning one or more frequencies that are below frequencies in the higher frequency range. For example, the antenna element 322 may be used to transduce between wireless and guided (e.g., wired) signals in a second frequency range over which the antenna element 322 is configured to resonate.

At stage 730, the method 700 includes providing an approximate open circuit over the lower frequency range to a transmission line connected to the second antenna element. For example, the filter 324 (e.g., the filter 400 or the filter 500) may provide the open circuit 326 over a first frequency range (FR1) to the transmission line 370 connected to the antenna element 322. The filter 324, e.g., the filter 400 (e.g., the resonator 410, or the resonator 410 and the inductor 420) or the filter 500 (e.g., the resonator 510, or the resonator 510 and one of the inductors 521-523, in combination with the switch 530, possibly in combination with the processor 650) may comprise means for providing the approximate open circuit.

At stage 740, the method 700 includes providing an approximate short circuit over the higher frequency range to the transmission line to inhibit a parasitic effect of the second antenna element on the first antenna element. For example, the filter 324 (e.g., the filter 400 or the filter 500) may provide the short circuit 328 over a second frequency range (FR2) to the transmission line 370 connected to the antenna element 322. The filter 324, e.g., the filter 400 (e.g., the resonator 410, or the resonator 410 and the inductor 420) or the filter 500 (e.g., the resonator 510, or the resonator 510 and one of the inductors 521-523, in combination with the switch 530, possibly in combination with the processor 650) may comprise means for providing the approximate short circuit.

Implementations of the method 700 may include one or more of the following features. In an example implementation, providing the approximate short circuit comprises tuning a short-circuit frequency range of the approximate short circuit. For example, the inductor 420 or the inductor bank 520 may be used to tune the frequency range over which the filter 324 provides the short circuit 328. The inductor 420 may comprise means for tuning the short-circuit frequency range. The inductor bank 520, in combination with the switch 530, possibly in combination with the processor 650, may comprise means for tuning the short-circuit frequency range.

IMPLEMENTATION EXAMPLES

Implementation examples are provided in the following numbered clauses.

Clause 1. An apparatus comprising:

a first antenna element configured to resonate in a higher frequency range;

a second antenna element configured to resonate in a lower frequency range, the lower frequency range spanning one or more frequencies that are below frequencies in the higher frequency range; and a filter connected to the second antenna element, the filter being configured to have a frequency-dependent impedance that is approximately an open circuit over the lower frequency range and that is approximately a short circuit over the higher frequency range, the filter being connected to a position of the second antenna element to inhibit a parasitic effect of the second antenna element on the first antenna element.

Clause 2. The apparatus of clause 1, wherein the first antenna element comprises a first elongated radiator, the second antenna element comprises a second elongated radiator, a first end of the first elongated radiator is disposed proximate to a second end of the second elongated radiator, and the filter is connected proximate to the second end of the second elongated radiator.

Clause 3. The apparatus of clause 2, wherein the filter is connected to the second end of the second elongated radiator within one-tenth of a wavelength of a highest frequency in the higher frequency range.

Clause 4. The apparatus of either of clause 2 or clause 3, wherein the first elongated radiator is a first metal frame conductor and the second elongated radiator is a second metal frame conductor, and the first end of the first elongated radiator is separated from the second end of the second elongated radiator by less than one-tenth of a wavelength of a highest frequency in the higher frequency range.

Clause 5. The apparatus of any of clauses 1-4, wherein the filter comprises an acoustic wave resonator.

Clause 6. The apparatus of clause 5, wherein the filter comprises an inductor in series with the acoustic wave resonator.

Clause 7. The apparatus of clause 5, wherein the filter comprises a plurality of inductors and a switch configured to selectively connect one of the plurality of inductors at a time in series with the acoustic wave resonator.

Clause 8. The apparatus of any of clauses 5-7, wherein the acoustic wave resonator consists of a single acoustic wave resonator.

Clause 9. The apparatus of any of clauses 5-7, wherein the acoustic wave resonator comprises a surface acoustic wave resonator or a bulk acoustic wave resonator.

Clause 10. The apparatus of any of clauses 1-9, wherein the frequency-dependent impedance has a normalized impedance magnitude of less than 0.05 over the higher frequency range and of at least 10 over the lower frequency range.

Clause 11. The apparatus of any of clauses 1-9, wherein the lower frequency range has a fractional bandwidth of less than 10%.

Clause 12. A signal transfer method comprising:

transducing a first signal using a first antenna element, of an apparatus, configured to resonate in a higher frequency range;

transducing a second signal using a second antenna element, of the apparatus, configured to resonate in a lower frequency range, the lower frequency range spanning one or more frequencies that are below frequencies in the higher frequency range;

providing an approximate open circuit over the lower frequency range to a transmission line connected to the second antenna element; and providing an approximate short circuit over the higher frequency range to the transmission line to inhibit a parasitic effect of the second antenna element on the first antenna element.

Clause 13. The signal transfer method of clause 12, wherein providing the approximate short circuit comprising tuning a short-circuit frequency range of the approximate short circuit.

Clause 14. An apparatus comprising:

a first antenna element configured to resonate in a higher frequency range;

a second antenna element configured to resonate in a lower frequency range, the lower frequency range spanning one or more frequencies that are below frequencies in the higher frequency range;

means for providing an approximate open circuit over the lower frequency range to a transmission line connected to the second antenna element; and means for providing an approximate short circuit over the higher frequency range to the transmission line to inhibit a parasitic effect of the second antenna element on the first antenna element.

Clause 15. The apparatus of clause 14, wherein the means for providing the approximate short circuit comprise means for tuning a short-circuit frequency range of the approximate short circuit.

Clause 16. An apparatus comprising:

a first antenna element configured to resonate in a higher frequency range, the first antenna element comprising a first elongated conductor disposed at least proximate to a periphery of the apparatus;

a second antenna element configured to resonate in a lower frequency range, the lower frequency range spanning one or more frequencies that are below frequencies in the higher frequency range, the second antenna element comprising a second elongated conductor disposed at least proximate to the periphery of the apparatus, a first end of the first elongated conductor being separated from a second end of the second elongated conductor by less than one-tenth of a wavelength of a highest frequency in the higher frequency range; and a filter connected proximate to the second end of the second elongated conductor, the filter being configured to provide an approximate open circuit over the lower frequency range and an approximate short circuit over the higher frequency range.

Clause 17. The apparatus of clause 16, wherein the filter is connected via a transmission line to the second end of the second elongated conductor within one-tenth of the wavelength of a highest frequency in the higher frequency range.

Clause 18. The apparatus of either of clauses 16 or 17, wherein the filter comprises an acoustic wave resonator.

Clause 19. The apparatus of clause 18, wherein the filter comprises an inductor in series with the acoustic wave resonator.

Clause 20. The apparatus of clause 18, wherein the filter comprises a plurality of inductors and a switch configured to selectively connect one of the plurality of inductors at a time in series with the acoustic wave resonator.

Clause 21. The apparatus of any of clauses 18-20, wherein the acoustic wave resonator consists of a single acoustic wave resonator.

Clause 22. The apparatus of any of clauses 18-20, wherein the acoustic wave resonator comprises a surface acoustic wave resonator or a bulk acoustic wave resonator.

Clause 23. The apparatus of any of clauses 16-22, wherein the approximate short circuit has a first normalized impedance magnitude of less than 0.05 over the higher frequency range and the approximate open circuit has a second normalized impedance magnitude of at least 10 over the lower frequency range.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes at least one, i.e., one or more, of such devices (e.g., "a processor" includes at least one processor (e.g., one processor, two processors, etc.), "the processor" includes at least one processor, "a memory" includes at least one memory, "the memory" includes at least one memory, etc.). The phrases "at least one" and "one or more" are used interchangeably and such that "at least one" referred-to object and "one or more" referred-to objects include implementations that have one referred-to object and implementations that have multiple referred-to objects. For example, "at least one processor" and "one or more processors" each includes implementations that have one processor and implementations that have multiple processors.

The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. An apparatus comprising:

a first antenna element configured to resonate in a higher frequency range;

a second antenna element configured to resonate in a lower frequency range, the lower frequency range spanning one or more frequencies that are below frequencies in the higher frequency range; and a filter connected to the second antenna element, the filter being configured to have a frequency-dependent impedance that is approximately an open circuit over the lower frequency range and that is approximately a short circuit over the higher frequency range, the filter being connected to a position of the second antenna element to inhibit a parasitic effect of the second antenna element on the first antenna element.

2. The apparatus of claim 1, wherein the first antenna element comprises a first elongated radiator, the second antenna element comprises a second elongated radiator, a first end of the first elongated radiator is disposed proximate to a second end of the second elongated radiator, and the filter is connected proximate to the second end of the second elongated radiator.

3. The apparatus of claim 2, wherein the filter is connected to the second end of the second antenna element within one-tenth of a wavelength of a highest frequency in the higher frequency range.

4. The apparatus of claim 2, wherein the first elongated radiator is a first metal frame conductor and the second elongated radiator is a second metal frame conductor, and the first end of the first elongated radiator is separated from the second end of the second elongated radiator by less than one-tenth of a wavelength of a highest frequency in the higher frequency range.

5. The apparatus of claim 1, wherein the filter comprises an acoustic wave resonator.

6. The apparatus of claim 5, wherein the filter comprises an inductor in series with the acoustic wave resonator.

7. The apparatus of claim 5, wherein the filter comprises a plurality of inductors and a switch configured to selectively connect one of the plurality of inductors at a time in series with the acoustic wave resonator.

8. The apparatus of claim 5, wherein the acoustic wave resonator consists of a single acoustic wave resonator.

9. The apparatus of claim 5, wherein the acoustic wave resonator comprises a surface acoustic wave resonator or a bulk acoustic wave resonator.

10. The apparatus of claim 1, wherein the frequency-dependent impedance has a normalized impedance magnitude of less than 0.05 over the higher frequency range and of at least 10 over the lower frequency range.

11. The apparatus of claim 1, wherein the lower frequency range has a fractional bandwidth of less than 10%.

12. A signal transfer method comprising:

transducing a first signal using a first antenna element, of an apparatus, configured to resonate in a higher frequency range;

transducing a second signal using a second antenna element, of the apparatus, configured to resonate in a lower frequency range, the lower frequency range spanning one or more frequencies that are below frequencies in the higher frequency range;

providing an approximate open circuit over the lower frequency range to a transmission line connected to the second antenna element; and providing an approximate short circuit over the higher frequency range to the transmission line to inhibit a parasitic effect of the second antenna element on the first antenna element.

13. The signal transfer method of claim 12, wherein providing the approximate short circuit comprising tuning a short-circuit frequency range of the approximate short circuit.

14. An apparatus comprising:

a first antenna element configured to resonate in a higher frequency range;

a second antenna element configured to resonate in a lower frequency range, the lower frequency range spanning one or more frequencies that are below frequencies in the higher frequency range;

first filter means for providing an approximate open circuit over the lower frequency range to a transmission line connected to the second antenna element; and second filter means for providing an approximate short circuit over the higher frequency range to the transmission line to inhibit a parasitic effect of the second antenna element on the first antenna element.

15. The apparatus of claim 14, wherein the means for providing the approximate short circuit comprise means for tuning a short-circuit frequency range of the approximate short circuit.

16. An apparatus comprising:

a first antenna element configured to resonate in a higher frequency range, the first antenna element comprising a first elongated conductor disposed at least proximate to a periphery of the apparatus;

a second antenna element configured to resonate in a lower frequency range, the lower frequency range spanning one or more frequencies that are below frequencies in the higher frequency range, the second antenna element comprising a second elongated conductor disposed at least proximate to the periphery of the apparatus, a first end of the first elongated conductor being separated from a second end of the second elongated conductor by less than one-tenth of a wavelength of a highest frequency in the higher frequency range; and a filter connected proximate to the second end of the second elongated conductor, the filter being configured to provide an approximate open circuit over the lower frequency range and an approximate short circuit over the higher frequency range.

17. The apparatus of claim 16, wherein the filter is connected via a transmission line to the second end of the second antenna element within one-tenth of the wavelength of a highest frequency in the higher frequency range.

18. The apparatus of claim 16, wherein the filter comprises an acoustic wave resonator.

19. The apparatus of claim 18, wherein the filter comprises an inductor in series with the acoustic wave resonator.

20. The apparatus of claim 18, wherein the filter comprises a plurality of inductors and a switch configured to selectively connect one of the plurality of inductors at a time in series with the acoustic wave resonator.

21. The apparatus of claim 18, wherein the acoustic wave resonator consists of a single acoustic wave resonator.

22. The apparatus of claim 18, wherein the acoustic wave resonator comprises a surface acoustic wave resonator or a bulk acoustic wave resonator.

23. The apparatus of claim 16, wherein the approximate short circuit has a first normalized impedance magnitude of less than 0.05 over the higher frequency range and the approximate open circuit has a second normalized impedance magnitude of at least 10 over the lower frequency range.

* * * * *